US007808713B2

(12) United States Patent
Quach et al.

(10) Patent No.: US 7,808,713 B2
(45) Date of Patent: Oct. 5, 2010

(54) INTENSITY-BASED ONE-WAY VISIBLE DISPLAY SYSTEM

(75) Inventors: Cang V. Quach, Milpitas, CA (US); Donald L. Alvarez, Woodinville, CA (US)

(73) Assignee: Emiscape, Inc., San Francisco, CA (US)

( * ) Notice: Subject to any disclaimer, the term of this patent is extended or adjusted under 35 U.S.C. 154(b) by 35 days.

(21) Appl. No.: 12/203,521

(22) Filed: Sep. 3, 2008

(65) Prior Publication Data

US 2010/0053762 A1 Mar. 4, 2010

(51) Int. Cl.
*G02B 27/10* (2006.01)
*G02B 27/14* (2006.01)

(52) U.S. Cl. ...................................... 359/629; 359/636

(58) Field of Classification Search ................. 359/636, 359/637, 639, 738, 804, 809
See application file for complete search history.

(56) References Cited

U.S. PATENT DOCUMENTS

2005/0104823 A1 * 5/2005 Giraldo et al. ................ 345/87

* cited by examiner

*Primary Examiner*—Alicia M Harrington
(74) *Attorney, Agent, or Firm*—Patent Law Group LLP; David C. Hsia

(57) ABSTRACT

A one-way display system includes a partially reflective screen with a first image, and a partially absorptive screen with a second image that is an inverse of the first image. The two screens can be stacked on top of each other or separated by a small distance. A portion of ambient light on a first side of the display system passes through the partially reflective screen and exits as intermediate light. A portion of the intermediate light passes through the partially absorptive screen and exits as transmitted light to a second side of the display system. The transmitted light is spatially and chromatically uniform like the ambient light. This allows observers on the second side to see objects on the first side without the first image, and observers on the first side to see the first image.

13 Claims, 2 Drawing Sheets

INTENSITY-BASED ONE-WAY VISIBLE DISPLAY SYSTEM

CROSS REFERENCE TO RELATED APPLICATION

This application is related to (1) U.S. patent application Ser. No. 11/109,543, now U.S. Pat. No. 7,213,930, entitled "Polarized Projection Display," filed on Apr. 18, 2005, (2) U.S. patent application Ser. No. 11/686,195, entitled "Polarized Projection Display," filed on Mar. 14, 2007, (3) U.S. patent application Ser. No. 11/367,687, entitled "One-Way Transparent Display Systems," filed on Mar. 3, 2006, and (4) U.S. patent application Ser. No. 11/626,247, entitled "Projection Display with Holographic Screen," filed on Jan. 23, 2007, (5) U.S. patent application Ser. No. 11/782,597, entitled "One-Way Display Using Color Filter," filed on Jul. 24, 2007, which are incorporated herein by reference, and (6) U.S. patent application Ser. No. 11/951,183, entitled "Reflective One-Way Screen with Chromatic and Transparent Regions," filed on Dec. 5, 2007.

FIELD OF INVENTION

This invention relates to displays, and specifically to transparent displays with an image that is visible from one side of the display but not the other.

DESCRIPTION OF RELATED ART

Generally speaking, advertising is the paid promotion of goods, services, companies and ideas by an identified sponsor. Advertisements on the sides of buildings were common in the early-20th century U.S. One modern example is the NASDAQ sign at the NASDAQ Market Site at 4 Times Square on 43rd Street. Unveiled in January 2000, it cost $37 million to build. The sign is 120 feet high and is the largest LED display in the world. NASDAQ pays over $2 million a year to lease the space for this sign. This is considered a good deal in advertising as a result of the number of "impressions" the sign makes far exceeds those generated by other ad forms. However, advertisements on the side of a building cover up what otherwise would be space for windows in the building.

Thus, what is needed is an apparatus that would provide advertisements on the side of buildings while still allowing for windows in the advertisement space.

SUMMARY

In one embodiment of the invention, a one-way partially transparent display system is provided for use in a situation where there are two observers (or two collections of observers), one of which is located in a brighter environment than the other, and both are separated by the display system. In this situation, it is advantageous to present an image to the observers on the bright side of the display without displaying the same image to observers on the dark side of the display (for example in order to present advertisements to people on the outside of a building without bothering workers inside the building with the same advertisements).

The display includes a partially reflective screen that faces the bright side and a partially absorptive screen that faces the dark side. The partially reflective screen has the image and the partially absorptive screen has an inverse image of that image. The two screens can be separated by a small distance or stacked on top of each other.

A portion of ambient light on the bright side of the display passes through the partially reflective screen and exits as intermediate light. The intermediate light is not spatially and chromatically uniform like the ambient light because the image on the partially reflective screen reflects (or otherwise redirects) another portion of the ambient light toward the observers on the bright side of the display so they can see the image.

A portion of the intermediate light passes through the partially absorptive screen and exits as transmitted light to the dark side of the display. The inverse image on the partially absorptive screen absorbs (or otherwise redirects) another portion of the intermediate light so that the transmitted light is spatially and chromatically uniform like the ambient light. By countering the effects of the image on the partially reflective screen, the inverse image on the partially absorptive screen allows the observers on the dark side to see objects on the bright side without the image on the partially reflective screen.

BRIEF DESCRIPTION OF THE DRAWINGS

Use of the same reference numbers in different figures indicates similar or identical elements.

DETAILED DESCRIPTION

Figure 1:
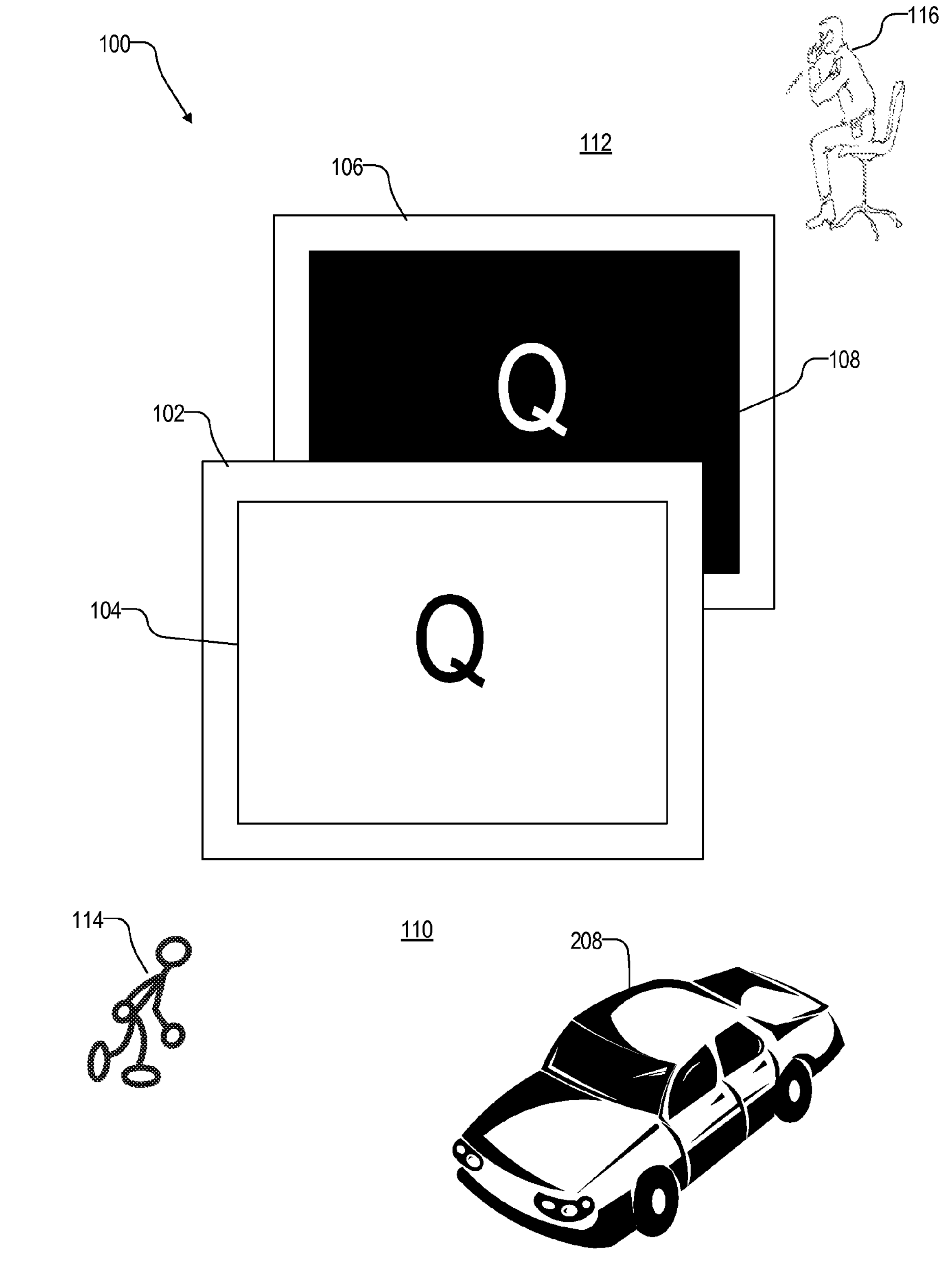
FIG. 1 illustrates a perspective view of an intensity-based one-way display system in one embodiment of the invention.

FIG. 1 illustrates an intensity-based one-way visible display system 100 in one embodiment of the invention. Display system 100 includes a partially reflective screen 102 with an image 104, and a partially absorptive screen 106 with an inverse image 108 of image 104. Screens 102 and 106 are adjacent and substantially parallel to each other. Screens 102 and 106 are illustrated as being separated by a large distance to demonstrate the concepts of the present invention but in practice they may be separated by a small gap or stacked on top of each other.

Display system 100 separates two environments where partially reflective screen 102 faces a relatively bright side 110 and partially absorptive screen 106 faces a relatively dark side 112. Typically display system 100 is, or forms part of, a window of a building so the exterior of the building is bright side 110 and the interior of the building is dark side 112.

Partially reflective screen 102 presents image 104 to observer 114 on bright side 110. In one embodiment, partially reflective screen 102 is glass, plastic, or other transparent materials, and image 104 is formed by a thin layer of paint, silk screening, stickers, or other partially reflective materials or coatings. Techniques for creating this type of partially reflective screen are well known to practitioners in fields such as sign-making and advertising. Alternatively, partially reflective screen 102 is a variable or controllable reflective screen, such as liquid crystal display (LCD) or electronic paper displays, and image 104 is formed by screen 102.

In the traditional usage of a partially reflective sign, observers on the dark side of the sign also see a representation of the image in that less light reaches them through portions of the sign where the observers on the bright side of the sign see more light reflected from the image. The observers on the dark side also see comparatively more light through portions of the sign where the observers on the bright side see less light reflected from the image. The representation of the image seen by the dark side observers is referred to as the inverse of the original image on the sign.

For the purposes of understanding this invention, it is important to recognize that an observer 116 on dark side 112 is significantly affected by the amount and distribution of light passing through partially reflective screen 102 from bright side 110 to dark side 112 but observer 114 on bright side 110 is substantially unaffected by the amount and distribution of light passing through screen 102 from dark side 112 to bright side 110 because the ambient illumination on bright side 110 is so much greater than the illumination coming through screen 102 from dark side 112.

The primary objective for display system 100 is to cause spatially and chromatically uniform transmission of light from bright side 110 to the dark side 112 while maintaining the spatially and chromatically non-uniform reflection of light on bright side 110. By either measuring or calculating the fraction of light transmitted through partially reflective screen 102 with image 104, it is possible to determine the fractional amount of light that needs to be absorbed by partially absorptive screen 106 with inverse image 108 in order to result in spatially and chromatically uniform transmission of light from bright side 110 to dark side 112 through the two screens. In the case of obtaining a chromatically uniform transmission, the reflection and absorption calculations may need to be performed at a plurality of frequencies or colors of light in order to select specific pigments or pigment mixtures for partially absorptive screen 106 with inverse image 108.

Figure 2:
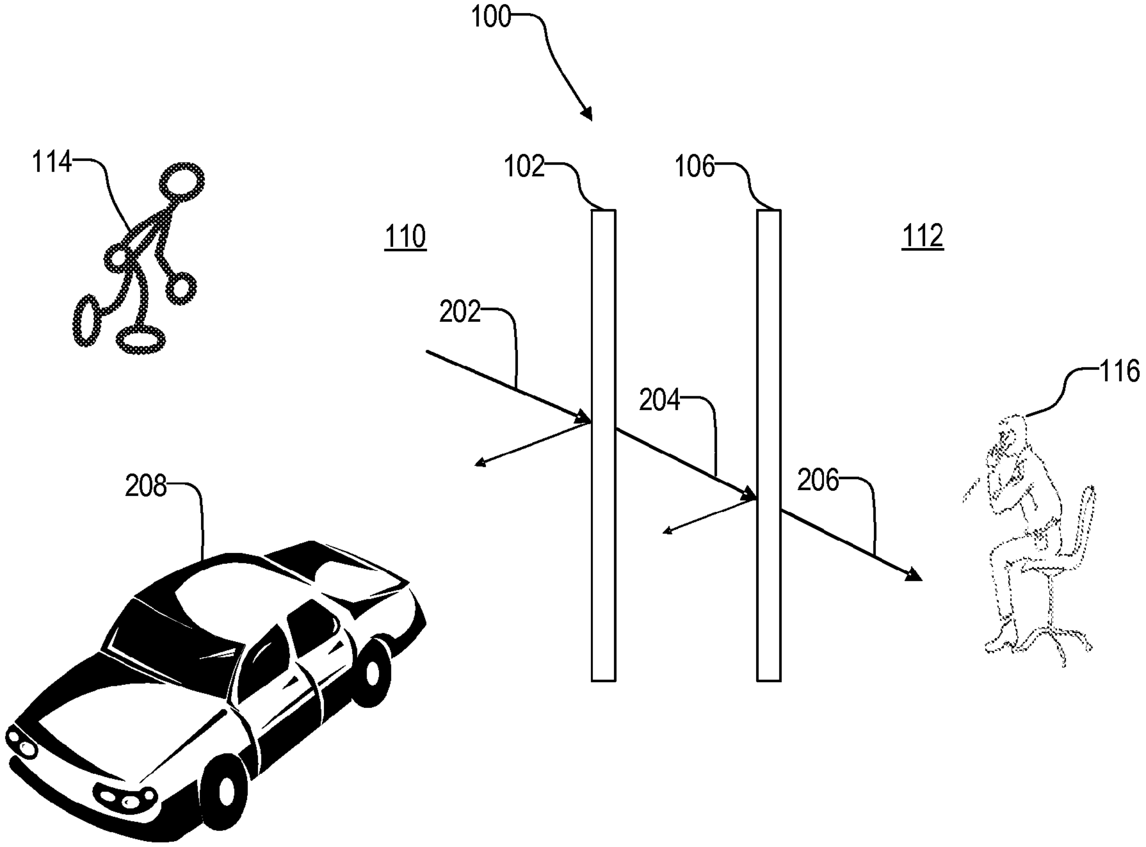
FIG. 2 illustrates a side view of the intensity-based one-way display system of FIG. 1 in one embodiment of the invention.

Referring to FIG. 2, ambient light 202 strikes partially reflective screen 102. A portion of ambient light 202 is at least partially reflected or otherwise redirected by image 104, and another portion passes through partially reflective screen 102 and emerges as intermediate light 204. Intermediate light 204 strikes partially absorptive screen 106. A portion of intermediate light 204 is at least partially absorbed or otherwise redirected by inverse image 108, and another portion passes through partially absorptive screen 106 (possible through inverse image 108) and emerges as transmitted light 206. Transmitted light 206 is spatially and chromatically uniform like ambient light 202 so observer 116 on dark side 112 of display system 100 do not see image 104 while they are able to see objects (e.g., observer 114 and car 208) on bright side 110 of display system 100.

In one embodiment, partially reflective screen 106 is glass, plastic, or other transparent materials, and image 108 is formed by a thin layer of paint, silk screening, stickers, or other partially reflective materials or coatings. Alternatively, partially reflective screen 106 is a variable or controllable reflective screen, such as LCD or electronic paper displays, and image 108 is formed by screen 106. In a further improvement of this invention, the use of variable or controllable reflective and absorptive screens in combination allows the operator of display system 100 to present an animated or variable image to the observers on the bright side of the display system while presenting a spatially and chromatically uniform view of the bright side to the observers on the dark side of the display system.

Various other adaptations and combinations of features of the embodiments disclosed are within the scope of the invention. Numerous embodiments are encompassed by the following claims.

What is claimed is:

1. A display system, comprising:

a partially reflective screen with a first image; and a partially absorptive screen with a second image that is an inverse of the first image, the partially absorptive screen being parallel and adjacent to the partially reflective screen.

2. The system of claim 1, wherein a portion of ambient light on a first side of the display system passes through the partially reflective screen and exits as intermediate light, a portion of the intermediate light passes through the partially absorptive screen and exits as transmitted light to a second side of the display system, and the transmitted light is substantially spatially uniform like the ambient light so an observer on the second side sees objects on the first side without the first image.

3. The system of claim 2, wherein the transmitted light is substantially chromatically uniform like the ambient light.

4. The system of claim 1, wherein at least one of the first and the second images is printed on its respective screen.

5. The system of claim 4, wherein the respective screen is selected from the group of glass and plastic.

6. The system of claim 1, wherein at least one of the first and the second images is a sticker affixed to its respective screen.

7. The system of claim 6, wherein the respective screen is selected from the group of glass and plastic.

8. The system of claim 1, wherein at least one of the first and the second images is displayed by its respective screen.

9. The system of claim 8, wherein the respective screen is selected from the group of a variable reflective screen, variable absorptive screen, controllable reflective screen, and controllable absorptive screen.

10. The system of claim 9, wherein the respective screen is selected from the group of an LCD display and an electronic ink display.

11. The method of claim 9, wherein the partially reflective and absorptive screens varies the first and the second images so an observers on a bright side of the display system is able to see the first image while another observer on a dark side of the display system sees objects on the bright side without the first image.

12. The system of claim 1, wherein the partially reflective screen and the partially absorptive screen are stacked on top of each other.

13. The system of claim 1, wherein the partially reflective screen and the partially absorptive screen are separated by a distance.

* * * * *